US011265628B2

(12) United States Patent
Araya et al.

(10) Patent No.: US 11,265,628 B2
(45) Date of Patent: Mar. 1, 2022

(54) OPTICAL TRANSMISSION SYSTEM AND OPTICAL TRANSMISSION METHOD

(71) Applicant: Nippon Telegraph and Telephone Corporation, Tokyo (JP)

(72) Inventors: Katsuhiro Araya, Tokyo (JP); Yoshihiko Uematsu, Tokyo (JP); Toshiyuki Oka, Tokyo (JP); Hiroki Kawahara, Tokyo (JP); Hiroshi Yamamoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/273,783

(22) PCT Filed: Aug. 23, 2019

(86) PCT No.: PCT/JP2019/033172
§ 371 (c)(1),
(2) Date: Mar. 5, 2021

(87) PCT Pub. No.: WO2020/050073
PCT Pub. Date: Mar. 12, 2020

(65) Prior Publication Data
US 2021/0321178 A1    Oct. 14, 2021

(30) Foreign Application Priority Data

Sep. 6, 2018    (JP) .............................. JP2018-166974

(51) Int. Cl.
*H04B 10/08*    (2006.01)
*H04B 17/00*    (2015.01)
(Continued)

(52) U.S. Cl.
CPC ......... *H04Q 11/0005* (2013.01); *H04B 10/29* (2013.01); *H04Q 2011/002* (2013.01);
(Continued)

(58) Field of Classification Search
CPC ....... H04Q 11/0005; H04Q 2011/0016; H04Q 2011/002; H04Q 2011/0045; H04B 10/29
See application file for complete search history.

(56) References Cited

U.S. PATENT DOCUMENTS

| 2013/0195460 A1* | 8/2013 | Kadohata ............ H04J 14/0257 398/79 |
| 2016/0056886 A1* | 2/2016 | Kitamura .............. H04L 47/745 398/5 |
| 2017/0324496 A1* | 11/2017 | Yamada ................ H04J 3/0623 |

OTHER PUBLICATIONS

Reviriego et al., "Improving Energy Efficiency in IEEE 802.3ba High-Rate Ethernet Optical Links," IEEE Journal of Selected Topics in Quantum Electronics, 2011, 17(2):419-427.

* cited by examiner

*Primary Examiner* — David G Payne
*Assistant Examiner* — Pranesh K Barua
(74) *Attorney, Agent, or Firm* — Fish & Richardson P.C.

(57) ABSTRACT

[PROBLEM TO BE SOLVED] To uninterruptedly change a band of an optical transmission path in a line IF section, which relays a signal transmitted to an optical transmission path in a client IF section to which a communication terminal is connected, to the same band as a changed band in the client IF section without suspending the communication in the line IF section.
[SOLUTION] An optical transmission system 10A performs processing for changing a band of an optical fiber 15 in a line IF section (L section) that relays a signal from an optical fiber 12 in a client IF section (C section) to the same band as that in the C section. Line IF units 24A and 24B provided on both sides of the L section set a temporary evacuation lane p as an optical lane having a band different from those of a plurality of optical lanes 0 to n in the optical fiber 15 in the L section, selects either a change-target optical lane (for example, the optical lane 0) or the temporary evacuation
(Continued)

lane p, the change-target optical lane being provided in the optical fiber 15 in the L section and having a band to be changed to a same band as a band in the C section, while causing a buffer unit 46 to absorb a delay difference between a signal received by the change-target optical lane and a signal received by the temporary evacuation lane p, and sets the optical lane not selected to have the same band as the band in the C section.

6 Claims, 8 Drawing Sheets

(51) Int. Cl.
     *H04Q 11/00*      (2006.01)
     *H04B 10/29*      (2013.01)
(52) U.S. Cl.
     CPC ................ *H04Q 2011/0016* (2013.01); *H04Q 2011/0045* (2013.01)

OPTICAL TRANSMISSION SYSTEM AND OPTICAL TRANSMISSION METHOD

CROSS-REFERENCE TO RELATED APPLICATIONS

This application is a National Stage application under 35 U.S.C. § 371 of International Application No. PCT/JP2019/033172, having an International Filing Date of Aug. 23, 2019, which claims priority to Japanese Application Serial No. 2018-166974, filed on Sep. 6, 2018. The disclosure of the prior application is considered part of the disclosure of this application, and is incorporated in its entirety into this application.

TECHNICAL FIELD

The present invention relates to an optical transmission system and an optical transmission method for changing a signal band of an optical transmission path in a line IF (Interface) section that relays a signal transmitted to an optical transmission path in a client IF section to which a communication terminal is connected, to the same signal band as that in the client IF section.

BACKGROUND ART

In recent years, the transmission capacity in communication specifications of optical transmission systems has continuously been increasing, and the transmission capacity per wavelength is approaching the limit. This has led various standardizing bodies such as the ITU-T (International Telecommunication Union Telecommunication Standardization Sector) and the IEEE (Institute of Electrical and Electronic Engineers) to consider application of parallel transmission methods such as n×100 Gbps as a transmission method for 100 Gbps or more, in addition to serial transmission methods. A communication standard ITU-TG.709/Y.1331.1 FlexO (Flexible OTN) provides a standard for transmitting OTUCn frames by interleaving the OTUCn frames on a plurality of physical IFs that are grouped. In addition, in the OIF (Optical Internetworking Forum) Flex Coherent DWDM (Dense Wavelength Division Multiplexing) Transmission Framework Document (OIF-FD-FLEXCOH-DWDM-01.0), an optical transmission/reception module in which a plurality of modulation methods and an error correcting code are flexibly changed based on a transmission distance has been standardized in the parallel transmission methods for a signal of 100 Gbps or more. Also, in the IEEE, to standardize 100 GbE and 400 GbE, a plurality of slow-speed IFs is used to increase the capacity at a low cost.

To achieve such an increase in capacity, in an optical transmission system, parallelization of IFs in each of a client IF unit and a line IF unit, which will be described below, has been considered. The client IF unit is an interface that is connected to a communication terminal such as a personal computer by using Ethernet (registered trademark). The line IF unit is an interface connected to an optical transmission path constituted of an optical fiber based on the OTN (Optical Transport Network) of the ITU-T.

In the client IF unit, a power saving technique of the EEE {Ethernet (registered trademark) Energy Efficient} used in a conventional electrical IF has been standardized to apply this technique to optical parallel IFs of 100 GbE (giga bit Ethernet) and 400 GbE.

FIG. 8 illustrates a configuration of an optical transmission system that uses such a client IF unit and a line IF unit.

An optical transmission system 10 illustrated in FIG. 8 includes a router 11 that is connected to a plurality of communication terminals (not illustrated) with optical fibers 18 and 19, an optical transmission apparatus 16 that transmits and receives an optical signal, an optical transmission apparatus not illustrated (an optical transmission apparatus having the same configuration as that of the optical transmission apparatus 16) that is connected to the optical transmission apparatus 16 via an optical fiber 15, and a router (a router having the same configuration as that of the router 11). The optical transmission apparatus 16 includes a transponder unit 14 that is connected to the router 11 with B optical fibers 12 and 13, an OXC (Optical Cross-connect) unit 23 constituted of an optical SW unit (not illustrated) that multiplexes an optical signal from this transponder unit 14 and sets a route and an optical amplifier (not illustrated) that amplifies the optical signal, and a monitoring control unit 17 that monitors and controls the transponder unit 14 and the OXC unit 23. The router 11 may be a layer-2 switch or the like as a concentrator having a function of switching a communication peer.

A section between the router 11 and the transponder unit 14 that are connected by the optical fiber 12 is a client IF section, and a section between the OXC unit 23 and an opposite-side OXC unit that are connected by the optical fiber 15 is a line IF section.

The router 11 includes a first client IF unit 21a that performs input and output of an optical signal of 400 GbE and a second client IF unit 22a that performs input and output of an optical signal of 100 GbE. The optical signal is a client signal transmitted from the communication terminal.

The transponder unit 14 includes a first client IF unit 21b for the optical signal of 400 GbE, a second client IF unit 22b for the optical signal of 100 GbE, a line IF unit 24, and a transponder control unit (also referred to as a control unit) 25.

The line IF unit 24 includes an OTN framer unit 31 and a plurality of optical lane signal processing units 37a, 37b, ..., and 37n. The OTN framer unit 31 includes a functional unit {ODU (Optical channel Data Unit) flex/ODUk} that maps the client signal into the an OTN payload, an OTNCn framer unit that multiplexes an ODU flex/ODUk signal that has been mapped, and a FLEXO framer unit that parallels an OTNCn frame in units of 100 Gbps.

The optical lane signal processing units 37a to 37n each include an FEC (Forward Error Correction) unit 33, a DSP (Digital Signal Processor) unit 34, a D/A (Digital/Analog) unit 35, and an E/O (Electrical/Optical) unit 36.

In the optical fiber 12 between the first client IF units 21a and 21b, there are provided four optical lanes (four lanes) La 1, La 2, La 3, and La 4 each of which has a different wavelength band (band) and transmits an optical signal of 100 Gbps. The four lanes La 1 to La 4 are set by the first client IF units 21a and 21b that operate in accordance with an optical lane setting control operation by the control unit 25.

In accordance with an on/off control by the control unit 25, the power supply to the four lanes La 1 to La 4 can be turned on or off per optical lane corresponding to the traffic on the optical fiber 12. For example, in a case where traffic from the communication terminal to the first client IF unit 21b is 200 Gbps, the power supply to the optical lanes La 3 and La 4 in the optical fiber 12 in the client IF section is turned off to reduce the overall band of the optical fiber 12 to 200 Gbps so that the power supply can be provided without waste.

In the optical fiber 13 between the second client IF units 22a and 22b, there are provided four optical lanes (four lanes) Lb 1, Lb 2, Lb 3, and Lb 4 each of which has a different wavelength band and transmits an optical signal of 25 Gbps. These four lanes Lb 1 to Lb 4 are also set in the same manner as with the four lanes La 1 to La 4 described above, and the power supply thereto can be turned on or off per optical lane. For example, in a case where traffic from the communication terminal to the second client IF unit 22b is 60 Gbps, the power supply to the optical lanes Lb 4 in the optical fiber 13 in the client IF section is turned off to reduce the overall band of the optical fiber 13 to 75 Gbps so that the power supply can be provided with least waste.

The first client IF unit 21b and the second client IF unit 22b in the transponder unit 14 each include an O/E (Optical/Electrical) conversion function that converts an optical signal received from the optical fiber 12 into an electrical signal and outputs the converted signal.

The first client IF unit 21b and the second client IF unit 22b are connected to the OTN framer unit 31 with a client signal standard {For example, Ethernet-MAC (Media Access Control), Ethernet-PHY (Physical layer) (PCS: Physical Coding Sublayer)}.

The OTN frame unit 31 maps signals (electrical signals) of 400 GbE and 1000 GbE to OTNCn frames base on the OTN standards.

A FlexO framer unit (not illustrated) in the OTN frame unit 31 divides an OTNCn signal into a plurality of FlexO frames in units of 100 Gbps and transmits the FlexO frames to the optical lane signal processing units.

The optical lane signal processing units 37a to 37n perform the following operations in accordance with the control by the control unit 25 on the optical lanes 0 to n.

Namely, the FEC unit 33 performs error correction coding and decoding of data of the framed signal. The FEC unit 33 can implement plurality of FEC methods so that an optimal mode can be selected based on the quality of a transmission path. For example, as described in the OIF Flex Coherent DWDM 7.1.3, the FEC unit 33 can implement a plurality of FEC modes having a different correction capability by changing the OH (Over Head). This error correction is processing in which replicated data and an error correcting code calculated from data is added to its original data and transmitted from a transmitting end in accordance with certain rules, and a receiving end receives this transmitted data and decodes the data on the transmitting end from the received data in accordance with a predetermined procedure. This decoding processing on the receiving end is also referred to as FEC synchronization processing in the present description.

The DSP unit 34 performs processing for generating a multi-level signal after the error correction coding, processing for removing waveform distortion caused by wavelength dispersion generated during the transmission through the optical fiber 12, polarization dispersion, a nonlinear effect, etc., processing for extracting a clock signal from the received signal and extracting a target signal, etc. In addition, the DSP unit 34 can select an optimal modulation method from a plurality of modulation methods so that the band can be changed based on the traffic from the client unit 21. For example, as described in the OIF Flex Coherent DWDM 7.1.2, by obtaining m (m=4, 8, 16, 32, 64)×QAM and by allowing a symbol rate to change to 32 GBd, 43 GBd, 51 GBd, and 64 GBd, the transmission band per wavelength can be changed from 100 Gbps to 400 Gbps.

The D/A unit 35 converts a digital signal that has been processed by the DSP unit 34 into an analog signal and outputs the converted signal to the I/O unit 36.

The E/O unit 36 converts an analog electrical signal into an optical signal. This optical signal is transmitted to each of the optical lanes 0 to n, each of which has a different wavelength, in the optical fiber 15 by a transmission function not illustrated. Specifically, the E/O unit 36 of the optical lane signal processing unit 37a transmits an optical signal to the optical lane 0 having a wavelength $\lambda 1$. The E/O unit 36 of the optical lane signal processing unit 37b transmits an optical signal to the optical lane 1 having a wavelength $\lambda 2$. The E/O unit 36 of the optical lane signal processing unit 37n transmits an optical signal to the optical lane n having a wavelength $\lambda n$.

In the optical transmission system 10 with the above configuration, the power supply to each of the optical lanes La 1 to La 4 and Lb 1 to Lb 4 in the optical fiber 12 in the client IF section can be turned on/off. Likewise, the power supply to each of the optical lanes 0 to n in the line IF section can be turned on/off. Thus, in the client IF section or the line IF section, power saving can be achieved by preventing unnecessary power consumption. NPL 1 also discloses an optical transmission technique for power saving.

CITATION LIST

Non Patent Literature

[NPL 1] B. Huiszoon, et al., "Improving Energy Efficiency in IEEE 802.3ba High-Rate Ethernet Optical Links", [online], 2011, [searched on Jun. 28, 2018], Internet <URL: https://ieeexplore.ieee.org/document/5492136/>

SUMMARY OF THE INVENTION

Technical Problem

In the optical transmission system 10 described above, when the setting of the band is changed in accordance with the traffic in the client IF section, the band in the line IF section needs to be changed correspondingly. For example, when the band corresponding to the traffic of the optical fiber 12 in the client IF section is widened from 100 Gbp to 200 Gbps, the band of, for example, the optical lane 0 in the line IF section also needs to be widened from 100 Gbps to 200 Gbps, before widening the band in the client IF section. In this case, the control unit 25 controls the optical lane signal processing unit 37a to temporarily suspend the operation related to the optical lane 0 and then sets the band to be widened to 200 Gbps. After this setting is made, the operation related to the optical lane 0 is resumed.

As described above, in the conventional optical transmission system 10, when the band in the client IF section is changed, the line IF section needs to be temporarily suspended to match the band in the line IF section to the changed band in the client IF section. Accordingly, a problem occurs in that communication between the transmission end and the reception end via the line IF section is temporarily suspended.

With foregoing in view, it is an object of the present invention to provide an optical transmission system and an optical transmission method that are capable of uninterruptedly changing the band of the optical transmission path in the line IF section, which relays a signal transmitted to the optical transmission path in the client IF section to which a communication terminal is connected, to the same band as the changed band in the client IF section without suspending the communication in the line IF section.

Means for Solving the Problem

As means for solving the above problem, the invention according to claim 1 provides an optical transmission system including opposed client IF (Interface) units, one being provided in a first relay to which a communication terminal is connected and the other being provided in an opposite-side second relay to which the first relay is connected via an optical transmission path, the client IF units setting, in the optical transmission path connecting the first and second relays, a plurality of optical lanes each having a different wavelength band, and opposed line IF units, one being provided in the second relay and the other being provided in an opposite-side second relay to which the second relay is connected via an optical transmission path, the line IF units setting, in the optical transmission path connecting the second relays, a plurality of optical lanes each having a different wavelength band, the optical transmission system performing processing for changing a band of the optical transmission path in a line IF section by the opposed line IF units that relay a signal transmitted through the optical transmission path in a client IF section by the opposed client IF units, wherein the line IF units include a processing unit that sets a temporary evacuation lane as an optical lane having a band different from those of the plurality of optical lanes in the optical transmission path in the line IF section, selects either a change-target optical lane or the temporary evacuation lane, the change-target optical lane being provided in the optical transmission path in the line IF section and having a band to be changed to a same band as a band in the client IF section, while causing a buffer unit to absorb a delay difference between a signal received by the change-target optical lane and a signal received by the temporary evacuation lane, and sets the optical lane not selected to have the same band as the band in the client IF section.

The invention according to claim 6 provides an optical transmission method of an optical transmission system that includes opposed client IF (interface) units, one being provided in a first relay to which a communication terminal is connected and the other being provided in an opposite-side second relay to which the first relay is connected via an optical transmission path, the client IF units setting, in the optical transmission path connecting the first and second relays, a plurality of optical lanes each having a different wavelength band, and includes opposed line IF units, one being provided in the second relay and the other being provided in an opposite-side second relay to which the second relay is connected via an optical transmission path, the line IF units setting, in the optical transmission path connecting the second relays, a plurality of optical lanes each having a different wavelength band, the optical transmission system performing processing for changing a band of the optical transmission path in a line IF section by the opposed line IF units that relay a signal transmitted through the optical transmission path in a client IF section by the opposed client IF units, the optical transmission method, including the steps of: setting, by the line IF unit, a temporary evacuation lane as an optical lane having a band different from those of the plurality of optical lanes in the optical transmission path in the line IF section; and selecting, by the line IF unit, either a change-target optical lane or the temporary evacuation lane, the change-target optical lane being provided in the optical transmission path in the line IF section and having a band to be changed to a same band as a band in the client IF section, while causing a buffer unit to absorb a delay difference between a signal received by the change-target optical lane and a signal received by the temporary evacuation lane, and setting the optical lane not selected to have the same band as the band in the client IF section.

According to the configuration in claim 1 and the method in claim 6, when the band of the optical transmission path in the client IF section to which a communication terminal is connected is changed, the band of the optical transmission path in the line IF section can be changed to the same band as that in the client IF section without interruption. In other words, the band of the optical transmission path in the line IF section that relays the signal from the optical transmission path in the client IF section to which a communication terminal is connected can be uninterruptedly changed to the same band as that of the changed band in the client IF section without suspending the communication in the line IF section.

The invention according to claim 2 provides the optical transmission system according to claim 1, wherein the line IF units further include a copy unit that copies a transmitted signal directed to the optical transmission path in the line IF section, wherein the processing unit sets a holding area in the buffer unit in the line IF unit on a receiving end, the holding area holding a signal amount corresponding to a delay difference between a signal received by the change-target optical lane and a signal received by the temporary evacuation lane to absorb the delay difference, wherein the processing unit transmits the transmitted signal which has been copied by the copy unit to the temporary evacuation lane to which a same band as that in the client IF section has been set and selects, after this transmitted signal has been received by the line IF unit on the receiving end, the signal received from the temporary evacuation lane via the buffer unit in which the holding area is set, and wherein the processing unit transmits a signal whose transmission speed is increased or decreased after the band of the change-target optical lane has been set to the same band as that in the client IF section and selects, after this transmitted signal has been received by the line IF unit on the receiving end, the signal received from the change-target optical lane via the buffer unit in which the holding area is set.

According to the above configuration, when the band of the optical transmission path in the client IF section is changed, the optical transmission system changes the band in the line IF section to the same band as the changed band, and the transmission speed of a signal is increased or decreased to have the same band as that of the transmission signal in the client IF section so that the signal can be transmitted to the optical transmission path in the line IF section after the band thereof has been changed.

The invention according to claim 3 provides the optical transmission system according to claim 1 or 2, wherein the processing unit performs processing for turning off a power supply to the temporary evacuation lane after the signal from the change-target optical lane has been selected.

According to the above configuration, the power supply can be provided without waste when the optical transmission path in the line IF section operates.

The invention according to claim 4 provides an optical transmission system that includes opposed client IF units, one being provided in a first relay to which a communication terminal is connected and the other being provided in an opposite-side second relay to which the first relay is connected via an optical transmission path, the client IF units setting, in the optical transmission path connecting the first and second relays, a plurality of optical lanes each having a different wavelength band, and includes opposed line IF units, one being provided in the second relay and the other being provided in an opposite-side second relay to which the second relay is connected via an optical transmission path, the line IF units setting, in the optical transmission path connecting the second relays, a plurality of optical lanes each having a different wavelength band, the optical transmission system performing processing for changing a band of the optical transmission path in a line IF section by the opposed line IF units that relay a signal transmitted through the optical transmission path in a client IF section by the opposed client IF units, wherein the second relay includes: a transmission buffer unit that holds a signal transmitted from the client IF unit in the first relay, in the client IF unit in the second relay, a reception buffer unit that holds a signal received by the line IF unit via the line IF section, and a processing unit that holds the signal transmitted from the first relay in the transmission buffer unit for a period of synchronization time needed for synchronizing a transmission end and a reception end when switching to a communication mode in which a modulation method and an error correction method are combined, the communication mode corresponding to an individual one of bands of optical lanes set in the optical transmission path in the line IF section, and that also performs synchronization processing for stopping a test signal corresponding to the communication mode at the reception buffer unit after receiving the test signal via the line IF section.

The invention according to claim 7 provides an optical transmission method of the optical transmission system that includes opposed client IF units, one being provided in a first relay to which a communication terminal is connected and the other being provided in an opposite-side second relay to which the first relay is connected via an optical transmission path, the client IF units setting, in the optical transmission path connecting the first and second relays, a plurality of optical lanes each having a different wavelength band, and includes opposed line IF units, one being provided in the second relay and the other being provided in an opposite-side second relay to which the second relay is connected via an optical transmission path, the line IF units setting, in the optical transmission path connecting the second relays, a plurality of optical lanes each having a different wavelength band, the optical transmission system performing processing for changing a band of the optical transmission path in a line IF section by the opposed line IF units that relay a signal transmitted through the optical transmission path in a client IF section by the opposed client IF units, wherein the second relay includes a transmission buffer unit that holds a signal transmitted from the client IF unit in the first relay, in the client IF unit in the second relay, a reception buffer unit that holds a signal received by the line IF unit via the line IF section, and a processing unit that performs processing for switching to a communication mode in which a modulation method and an error correction method are combined, the communication mode corresponding to an individual one of bands of optical lanes set in the optical transmission path in the line IF section, the optical transmission method, including steps of: holding, by the processing unit, the signal transmitted from the first relay in the transmission buffer unit for a period of synchronization time needed for synchronizing a transmission end and a reception end when switching to a communication mode in which a modulation method and an error correction method are combined, the communication mode corresponding to an individual one of bands of optical lanes set in the optical transmission path in the line IF section, and also performing synchronization processing for stopping a test signal corresponding to the communication mode at the reception buffer unit after receiving the test signal via the line IF section.

According to the configuration in claim 4 and the method in claim 7, while the transmitted signals (main signals) are being held in the transmission buffer unit, the test signals received via the line IF section are discarded by the reception buffer unit, and in the meantime, while transmitting idle signals to the client IFs, the synchronization processing is performed, and the communication mode is switched to the communication mode that corresponds to the changed band. In this way, the communication in the line IF section does not need to be suspended. In other words, the band of the optical transmission path in the line IF section that relays the signal transmitted through the optical transmission path in the client IF section to which the communication terminal is connected can be changed to the same band as that in the client IF section without interruption. In addition, since the temporary evacuation lane is not needed, the number of the components can be further reduced so that further reduction in power consumption can be achieved.

The invention according to claim 5 provides the optical transmission system according to claim 4, wherein the second relay further includes a control unit that sets, in setting tables, synchronization time measured by the synchronization processing that is performed after receiving synchronization time in the line IF section corresponding to various communication modes and performs a preliminary setting control operation by using the set synchronization time so that the processing unit can perform the synchronization processing.

According to the above configuration, when the band in the line IF section is changed and the communication mode is switched to a communication mode that corresponds to the changed band by establishing synchronization between the transmitting end the receiving end, the synchronization time preliminarily set in accordance with the control operation by the control unit is used. In this way, the processing unit can easily perform the synchronization processing.

Effects of the Invention

According to the present invention, it is possible to provide an optical transmission system and an optical transmission method that are capable of uninterruptedly changing the band of the optical transmission path in the line IF section that relays a signal transmitted to the optical transmission path in the client IF section, to which a communication terminal is connected, to the same band as the changed band in the client IF section without suspending the communication in the line IF section.

DESCRIPTION OF EMBODIMENTS

Figure 1:
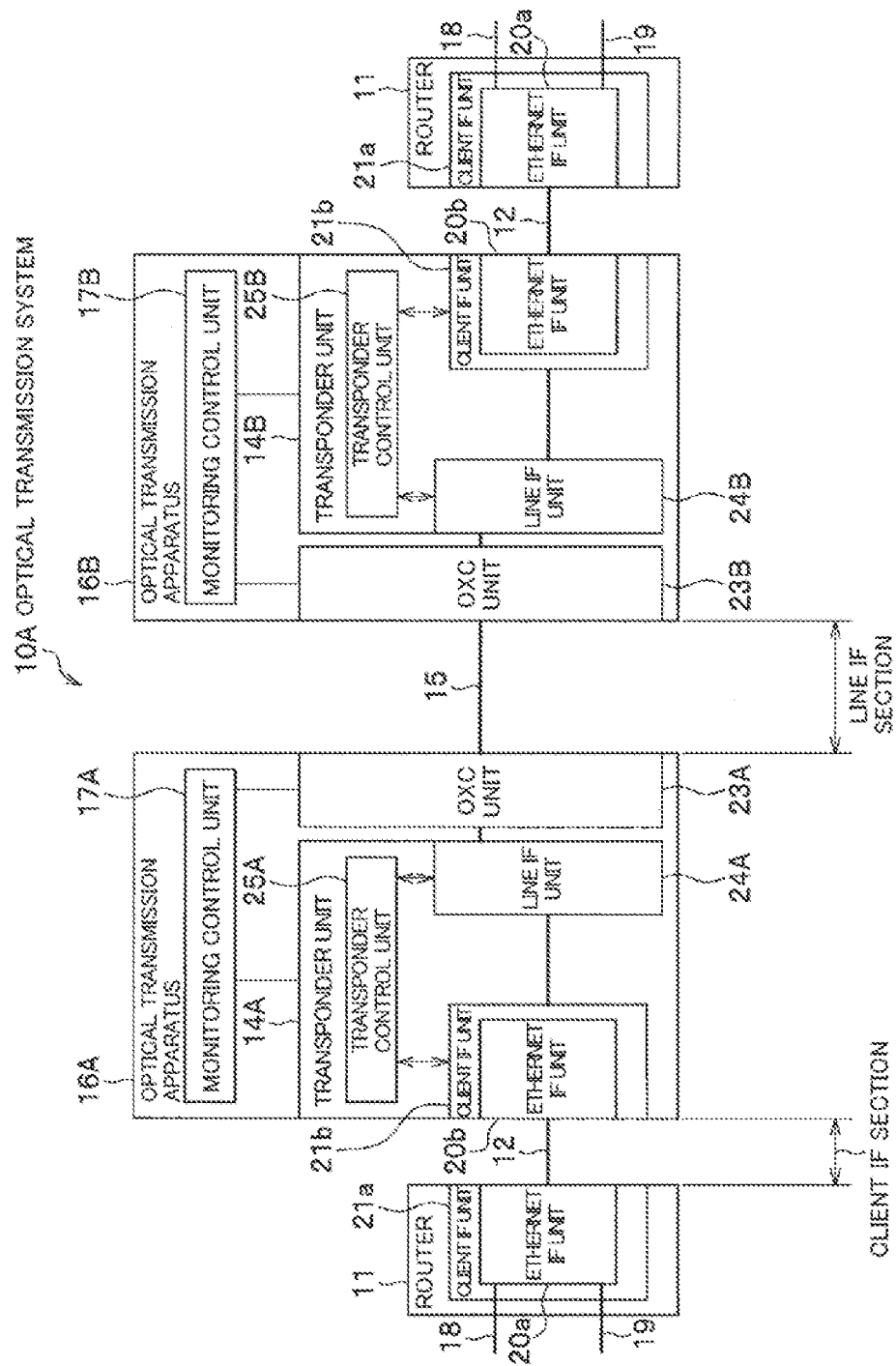
FIG. 1 is a block diagram illustrating a configuration of an optical transmission system according to a first embodiment of the present invention.

Hereinafter, embodiments of the present invention will be described with reference to the drawings. In all the drawings of the present description, like constituent elements are denoted by like reference characters, and descriptions thereof will be omitted.

Configuration of First Embodiment

FIG. 1 is a block diagram illustrating a configuration of an optical transmission system according to a first embodiment of the present invention.

An optical transmission system 10A illustrated in FIG. 1 includes a router 11 that is connected to a plurality of communication terminals (not illustrated) with optical fibers 18 and 19, an optical transmission apparatus 16A that transmits and receives an optical 0 signal, an optical transmission apparatus 16B that is connected to the optical transmission apparatus 16A via an optical fiber 15, and another router 11. The optical transmission apparatus 16A includes a transponder unit 14A that is connected to the router 11 with an optical fiber 12, an OXC unit 23A constituted of an optical SW unit (not illustrated) that multiplexes an optical signal from this transponder unit 14A and sets routes for the multiplexed optical signals and an optical amplifier (not illustrated) that amplifies the optical signal, and a monitoring control unit 17A that monitors and controls the transponder unit 14A and the OXC unit 23A. The optical transmission apparatus 16B includes an opposite-side OXC unit 23B to which the OXC unit 23A is connected via an optical fiber 15 on the other end, a transponder unit 14B, and a monitoring control unit 17B.

The routers 11 each include a client IF unit 21a having an Ethernet IF unit 20a. The transponder unit 25A or 25B includes a client IF unit 21a having an Ethernet IF unit 20b and a line IF unit 24A or 24B. The client IF units 21a and 21b are connected with each other by connecting the Ethernet IF units 20a and 20b with the optical fiber 12. A set of the client IF unit 21a having the Ethernet IF unit 20a and the client IF unit 21a having the Ethernet IF unit 20b may be provided in plural. The router 11 may be a layer-2 switch or the like as a concentrator having a function of switching a communication peer.

Figure 2:
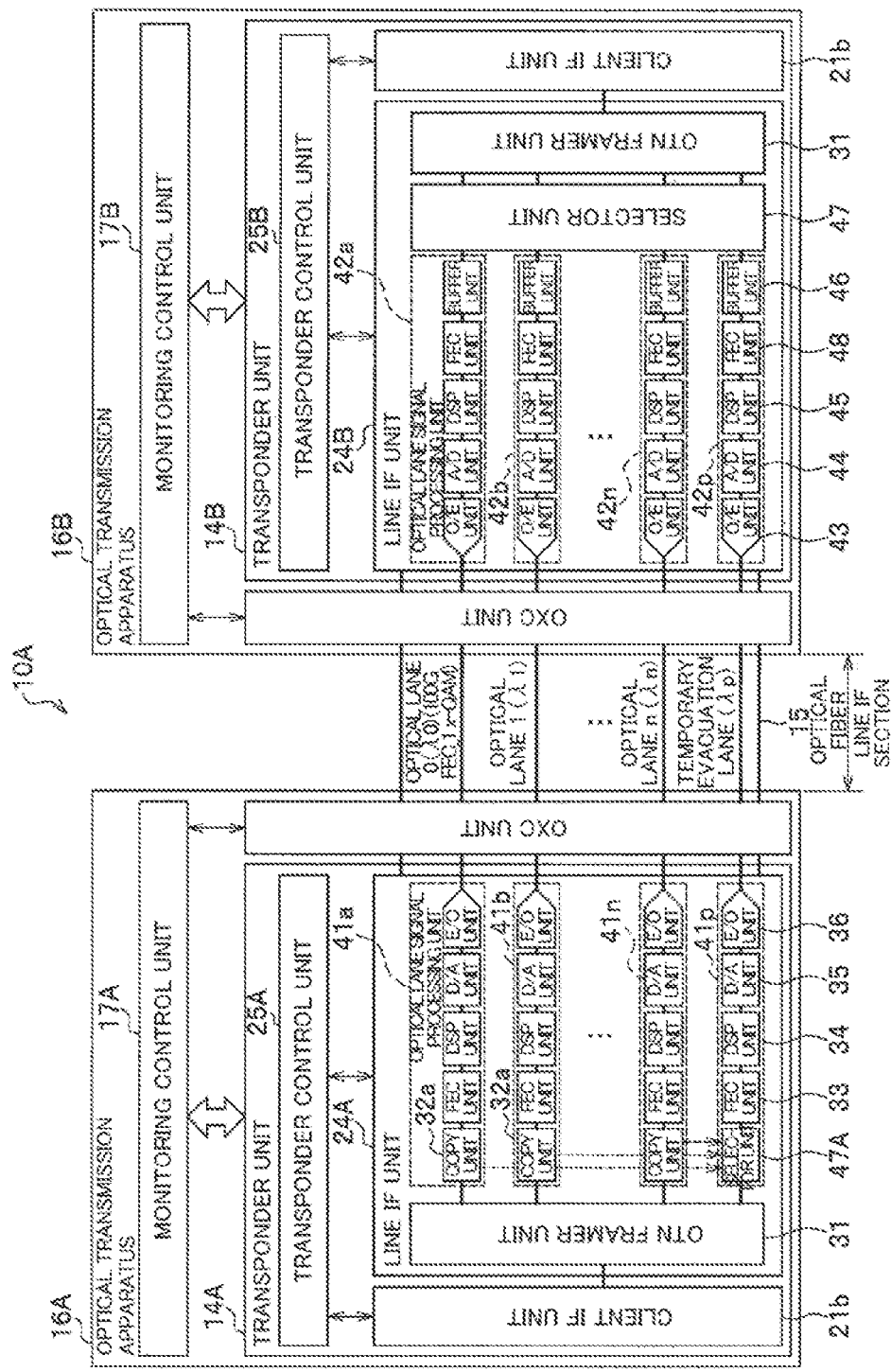
FIG. 2 is a block diagram illustrating configurations of a transponder unit on a transmitting end and a transponder unit on a receiving end.

The optical transmission system 10A according to the first embodiment differs from the conventional optical transmission system 10 (FIG. 8) in that the optical transmission system 10A includes the transponder units 14A and 14B that communicate with each other. The transponder units 14A and 14B have a similar configuration FIG. 2 illustrates functions of the transponder unit 14A on the transmitting end and functions of the transponder unit 14B on the receiving end.

The transponder unit 14A on the transmitting end differs from the conventional transponder unit 14 (FIG. 8) in the following points. Namely, a copy unit 32a is provided in each of the optical lane signal processing units 41a to 41n in the line IF unit 24A on the output side of the OTN framer unit 31, and a buffer unit 46 and a selector unit 47 are provided downstream of the FEC unit 48 in each of the optical lane signal processing units 41a to 41n in the line IF unit 24B.

Furthermore, the transponder unit 14A includes an optical lane signal processing unit 41p for forming a temporary evacuation lane p, which will be described below. The temporary evacuation lane p is formed with a different wavelength (λp) from that of optical lanes 0 to n in the optical fiber 15. The optical lane signal processing unit 41p has the same configuration as those of the other optical lane signal processing units 41a to 41n, except that a selector 47A is provided on the transmitting end.

The transponder unit 14B on the receiving end includes the optical lane signal processing units 42a to 42n, an optical lane signal processing unit 42p that performs processing related to the temporary evacuation lane p, and an OTN framer unit 31. The optical lane signal processing units 41a to 41n and 42a to 42n constitute a processing unit recited in the claims.

Each of the optical lane signal processing units 42a to 42n, and 42p includes an O/E unit 43, an A/D (Analog/Digital) unit 44, a DSP unit 45, and the FEC unit 48. Each of the optical lane signal processing units further includes the buffer unit 46 and the selector unit 47 downstream of the FEC unit 48 (on the side of the OTN framer unit 31). However, the selector 47 is provided extending across the optical lane signal processing units 42a to 42n and 42p.

The transponder control units (also referred to as the control units) 25A and 25B control the line IF units 24A and 24B to form the temporary evacuation lane p by allocating a wavelength band (band) different from those of the optical lanes 0 to n in the optical fiber 15. In addition, the control units 25A and 25B perform a control operation for increasing or decreasing the transmission speed of the signal transmitted through the optical lanes 0 to n in the optical fiber 15 in the line IF section in accordance with the band of the client IF section to have the same band as that of the client IF section.

Figure 3:
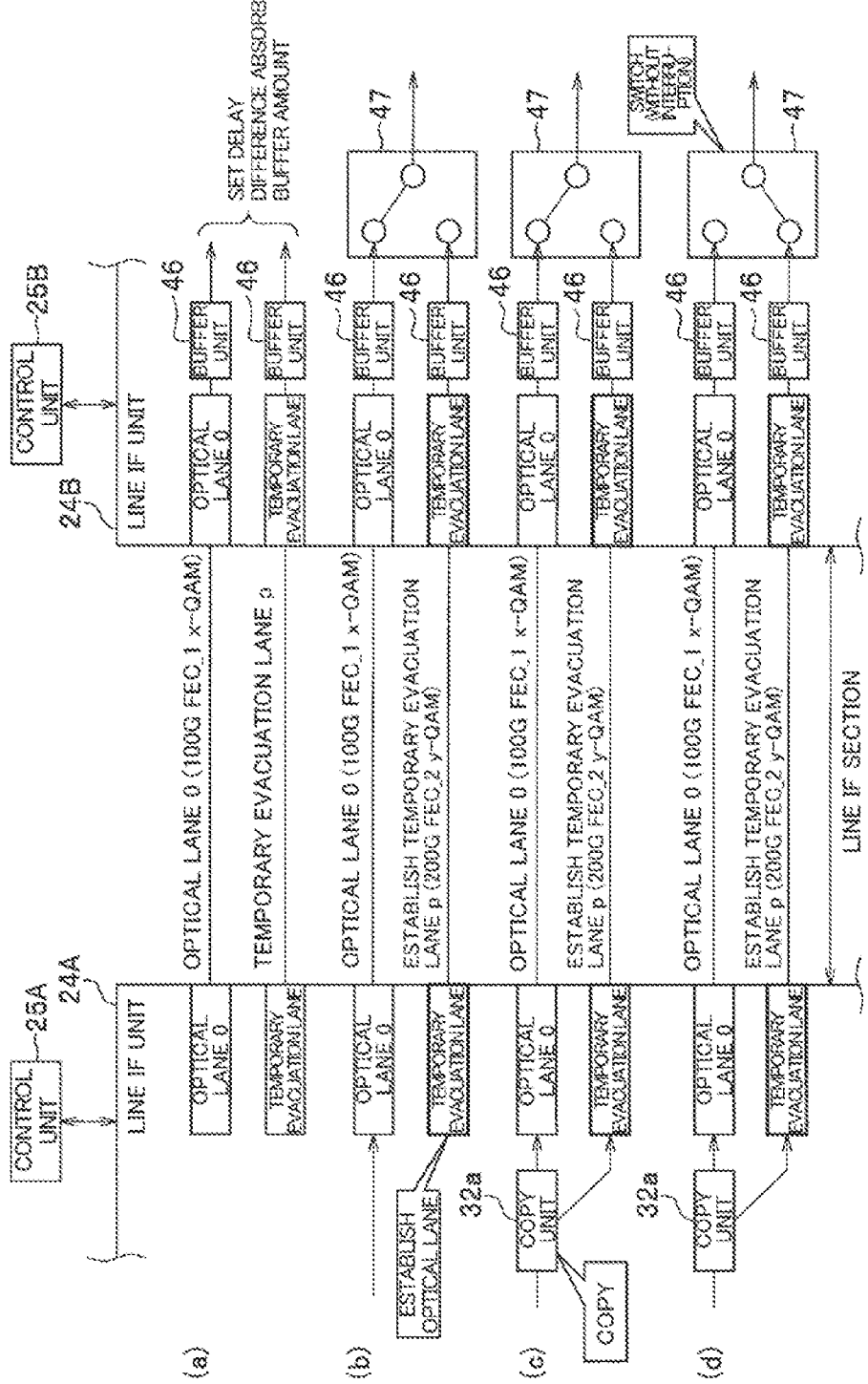
FIG. 3 is a first sequence diagram illustrating an operation of widening a wavelength band of an optical lane in an optical fiber in a line IF section.
Figure 4:
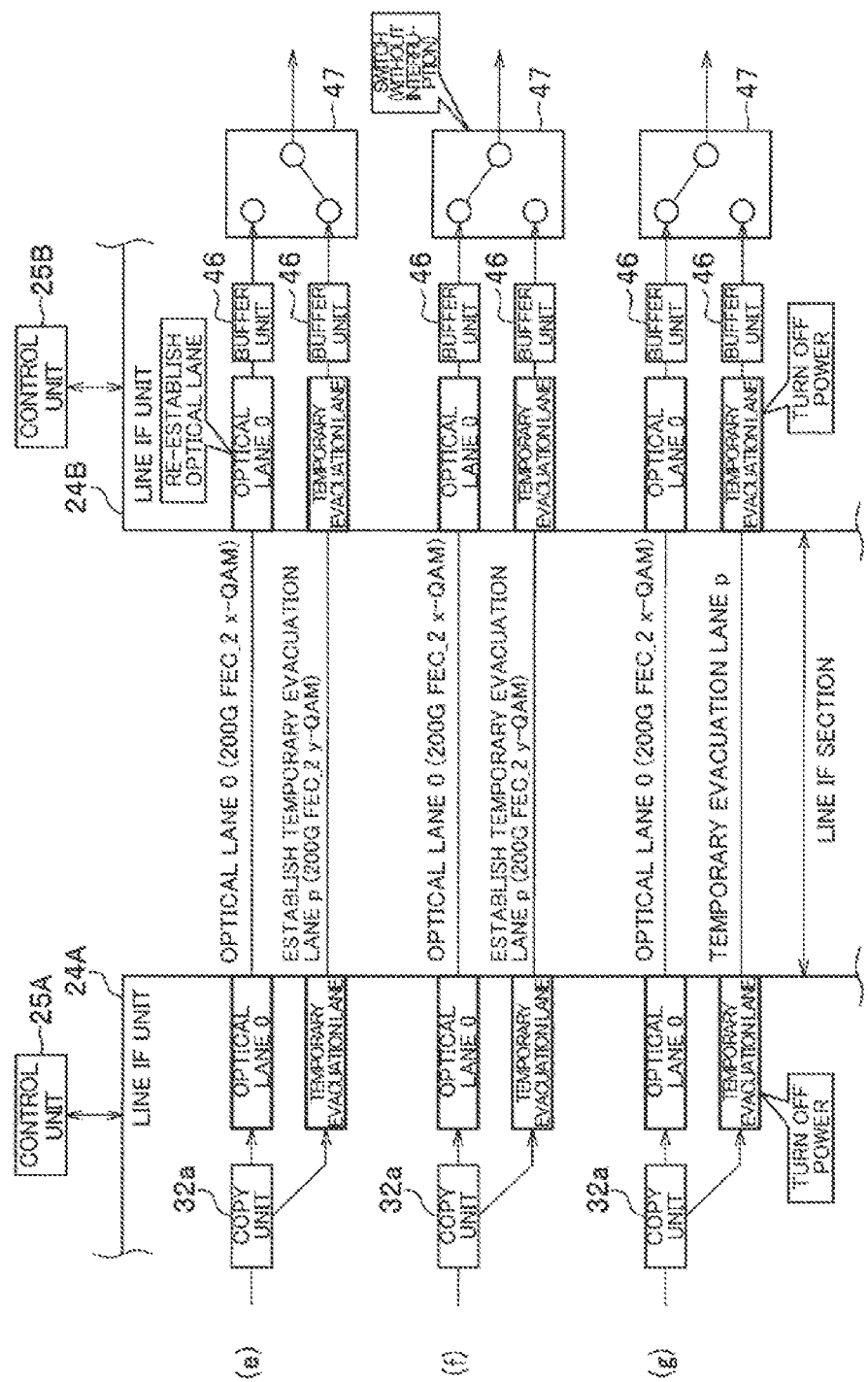
FIG. 4 is a second sequence diagram illustrating the operation of widening the wavelength band of the optical lane in the optical fiber in the line IF section.

Next, by using the optical lane 0 as an example, a control operation performed when a wavelength band of each of the optical lanes 0 to n is widened will be described with reference to FIGS. 3 and 4. The following description will be made assuming that, as denoted as "OPTICAL LANE 0 (100 G FEC_1 x-QAM)" in FIG. 2, an optical signal of 100 Gbps is being transmitted in the optical lane 0, the optical signal having been modulated from a data signal by using a communication mode in which "FEC_1" indicating an error correction method and "x-QAM (Quadrature Amplitude Modulation)" indicating a multi-level modulation method are combined. In addition, "x" in "x-QAM" represents a multiple value of QAM such as 4-QAM and 16-QAM.

As illustrated in FIG. 3(a), the control unit 25B on the receiving end measures a delay difference between the optical signal received by the optical lane 0 and the optical signal received by the temporary evacuation lane p in the line IF unit 24B and calculates a buffer amount that corresponds to the signal amount corresponding to the measured delay difference (or the signal data amount corresponding to the measured delay difference). This buffer amount is a delay difference absorbing buffer amount that can absorb the delay difference between the optical signals received by the optical lane 0 and the temporary evacuation lane p. The control unit 25B sets a holding area for holding the delay difference absorbing buffer amount in the corresponding buffer unit 46. The above means (the control unit 25B) for measuring the delay difference can be realized, for example, by using time synchronization information (IEEE 1588v2, etc.) provided from outside or by forwarding time information to a counterpart using the OTN overhead.

Next, as illustrated in FIG. 3(b), the control unit 25A on the transmitting end performs a control operation for setting the band of the temporary evacuation lane p to the same band as that in the client IF section. Specifically, when the control unit 25A changes the band of the optical lane 0 to 200 Gbps which is the band of the client IF section, the control unit 25A outputs, to the line IF unit 24A, a band change command (200 G FEC_2 y-QAM) directed to the temporary evacuation lane p. In response to this band change command, the line IF unit 24A sets the band of the temporary evacuation lane p to 200 Gbps and establishes the band. At this point, the optical lane 0 is selected by the selector unit 47 in the line IF unit 24B on the receiving end. In addition, "y" in "y-QAM" represents a multiple value of QAM such as 4-QAM and 16-QAM.

The above description corresponds to the following description recited in the claims, the above description stating that, while the optical lane 0 is selected by the selector unit 47, the band of the temporary evacuation lane p, which is not selected by the selector 47, is set to the same band as that in the client IF section. The description recited in the claims is a portion stating that "while causing a buffer unit to absorb a delay difference between a signal received by the change-target optical lane and a signal received by the temporary evacuation lane, and sets the optical lane not selected to have the same band as the band in the client IF section". In this description, the portion stating that "causing a buffer unit to absorb a delay difference between received signals" corresponds to the description of the buffer unit 46 above.

Next, as illustrated in FIG. 3(c), the control unit 25A on the transmitting end performs a control operation for copying the signal being transmitted to the optical lane 0. Specifically, the control unit 25A controls the line IF unit 24A to copy the signal. In response to this control, the copy unit 32a copies the signal being transmitted to the optical lane 0 and transmits the copied signal to the temporary evacuation lane p. This signal (or data) that has been transmitted to the temporary evacuation lane p is held in the buffer unit 46 on the receiving end. At this point, the optical lane 0 is selected by the selector unit 47.

Next, as illustrated in FIG. 3(d), the control unit 25B on the receiving end performs a switching control operation that causes the selector unit 47 to select the temporary evacuation lane p. When the select unit 47 has selected the temporary evacuation lane p in response to this control operation, the copied signals that have been held in the buffer unit 46 on the receiving end are transmitted downstream to the OTN framer 31 side via the selector unit 47. Namely, the switching of the signal is performed without interruption.

Next, as illustrated in FIG. 4(e), the control unit 25A on the transmitting end outputs the band change command (200 G FEC_2 y-QAM) to the line IF unit 24A. This command is for changing the band of the optical lane 0 to 200 Gbps, which is the band of the client IF section. When receiving the above band change command, the line IF unit 24A widens the band of the optical lane 0 to 200 Gbps and re-establishes the lane. After the lane has been re-established, the signal of 200 Gbps transmitted through the optical lane 0 is held in the buffer unit 46. At this point, the temporary evacuation lane p is selected by the selector unit 47.

Next, as illustrated in FIG. 4(f), the control unit 25B on the receiving end performs a switching-back control operation that causes the selector unit 47 to select the optical lane 0. When the selector unit 47 has selected the optical lane 0 in accordance with this switching-back control operation, the signals of 200 Gbps that have been accumulated in the buffer unit 46 are output downstream to the OTN framer unit 31 (FIG. 2). Namely, the switching of the signals is performed without interruption.

With the control operations illustrated in FIGS. 4(a) to (f), the band of the optical lane 0 is widened from 100 Gbps to 200 Gbps without interruption.

Next, as illustrated in FIG. 4(g), the control unit 25A on the transmitting end performs a control operation for turning off the power supply to the temporary evacuation lane p, and the temporary evacuation lane p is turned off accordingly. Alternatively, the temporary evacuation lane p may be brought into a deep sleep state.

Effects of First Embodiment

The optical transmission system 10A according to the first embodiment described above is provided in both the router 11 serving as a first relay to which a communication terminal is connected and the transponder unit 14A serving as an opposite-side second relay to which the router 11 is connected opposite to each other via the optical fiber 12. In this case, the optical transmission system 10A includes the opposed client IF units 21a, 21b and the opposed client IF units 22a, 22b each pair of which sets a plurality of optical lanes each having a different wavelength band in the optical fiber 12. In addition, the optical transmission system 10A is provided in both the transponder unit 14A and the transponder unit 14B serving as an opposite-side second relay to which the transponder unit 14A is connected opposite to each other via the optical fiber 15. In this case, the optical transmission system 10A includes the opposed line IF units 24A, 24B that set a plurality of optical lanes 0 to n each having a different wavelength band in the optical fiber 15. Furthermore, the optical transmission system 10A performs processing for changing the band of the optical fiber 15 in the line IF section that relays the signal from the optical fiber 12 in the client IF section. This optical transmission system 10A has the following features that achieve unique effects.

(1) The line IF units 24A, 24B include the optical lane signal processing units 41a to 41n, 42a to 42n. The optical lane signal processing units set a temporary evacuation lane p as an optical lane having a band different from those of the plurality of optical lanes 0 to n in the optical fiber 15 in the line IF section. The optical lane signal processing units select one of the two optical lanes, which will be described below, and set the optical lane not selected to have the same band as that in the client IF section. The two optical lanes refer to a change-target optical lane (for example, the optical lane 0) which is provided in the optical fiber 15 in the line IF section and whose band is to be changed to the same band as that in the client IF section and the temporary evacuation lane p. The optical lane signal processing units select one of these two lanes as described above, while causing the buffer unit 46 to absorb a delay difference between the signals received by the two lanes.

According to the above configuration, when the band of the optical fiber 12 in the client IF section to which a communication terminal is connected is changed, the band of the optical fiber 15 in the line IF section can be changed to the same band as that in the client IF section without interruption. In other words, the band of the optical fiber 15 in the line IF section that relays the signal from the optical fiber 12 in the client IF section to which a communication terminal is connected can be uninterruptedly changed to the same band as that of the changed band in the client IF section without suspending the communication in the line IF section.

(2) The line IF units 24A, 24B include a copy unit 32a that copies the transmitted signal directed to the optical fiber 15 in the line IF section. In addition, the optical lane signal processing units 41a to 41n, 42a to 42n set a holding area for holding a signal amount corresponding to the delay difference between the signal received by the change-target optical lane 0 and the signal received by the temporary evacuation lane p to absorb the delay difference, in the buffer unit 46 in the line IF unit 24B on the receiving end. In addition, the line IF unit 24A transmits the transmitted signal that has been copied by the copy unit 32a to the temporary evacuation lane p to which the same band as that of the client IF section has been set. After the line IF unit 24B on the receiving end has received this transmitted signal, the line IF unit 24B selects the signal received from the temporary evacuation lane p via the buffer unit 46 in which the holding area is set. Furthermore, the line IF unit 24A transmits a signal whose transmission speed has been increased or decreased after the band of the change-target optical lane is set to the same band as that in the client IF section. After the line IF unit 24B on the receiving end has received this transmitted signal, the line IF unit 24B selects the signal received from the change-target optical lane 0 via the buffer 46 in which the holding area is set.

According to the above configuration, when the band of the optical fiber 12 in the client IF section is changed, the optical transmission system 10A changes the band in the line IF section to the same band as the changed band, and the transmission speed of a signal is increased or decreased to have the same band as that of the transmission signal in the client IF section so that the signal can be transmitted to the filer 15 in the line IF section after the band thereof has been changed.

(3) The optical lane signal processing units 41a to 41n, 42a to 42n perform processing for turning off the power supply to the temporary evacuation lane p after the signal from the change-target optical lane 0 is selected.

According to the above configuration, the power supply can be provided without waste when the optical fiber 15 in the line IF section operates.

Configuration of Second Embodiment

Figure 5:
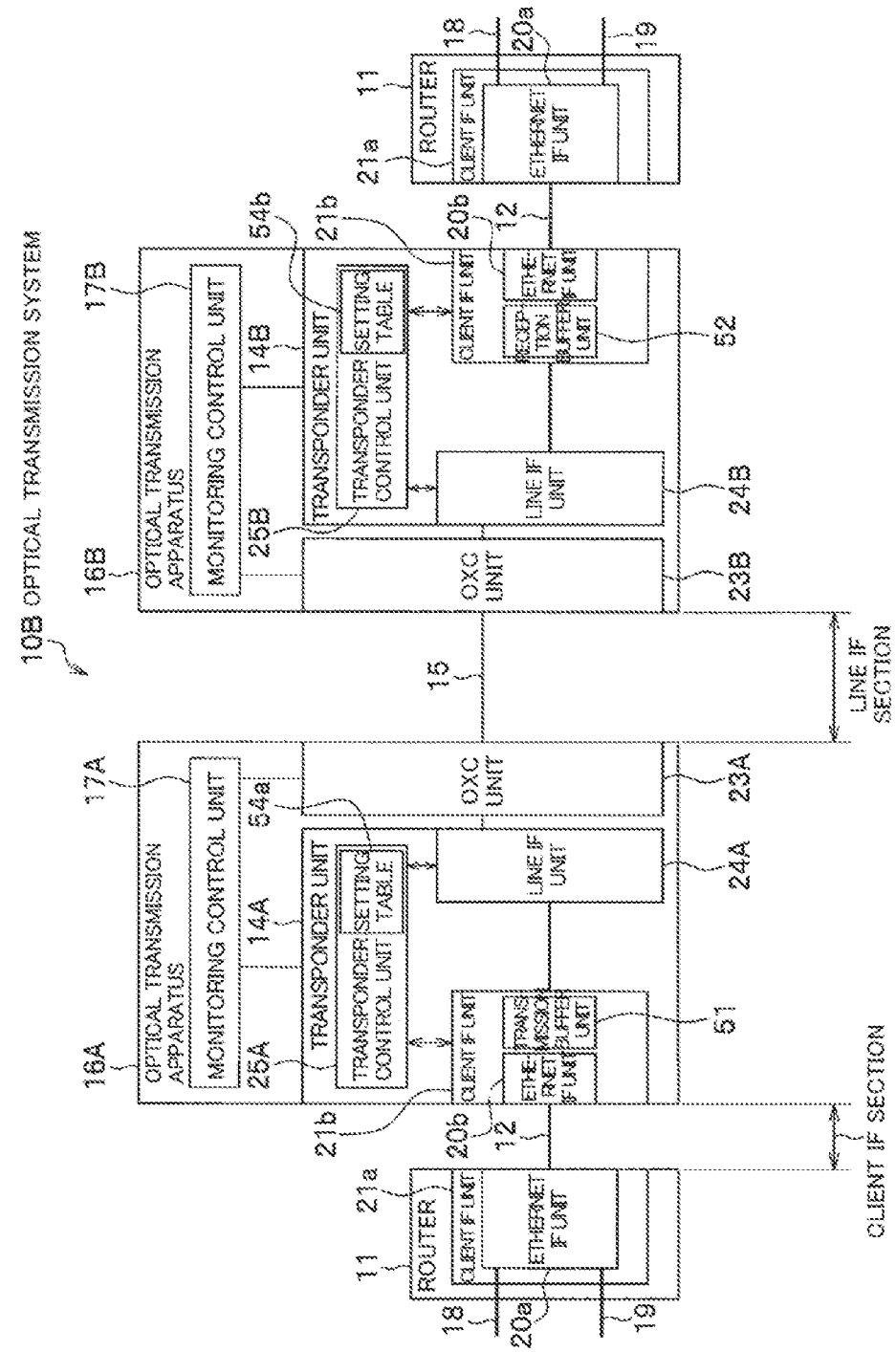
FIG. 5 is a block diagram illustrating a configuration of an optical transmission system according to a second embodiment of the present invention.

FIG. 5 is a block diagram illustrating a configuration of an optical transmission system according to a second embodiment of the present invention.

An optical transmission system 10B according to the second embodiment illustrated in FIG. 5 differs from the optical transmission system 10A (FIG. 1) in that transponder units 14A1, 14B1 (second relays) each of which is connected to a router 11 (first relay) with a B optical fiber 12 perform processing for changing a band in the line IF section to the same band as that in the client IF section without interruption by using a transmission buffer unit 51 and a reception buffer unit 52, which will be described below.

Figure 6:
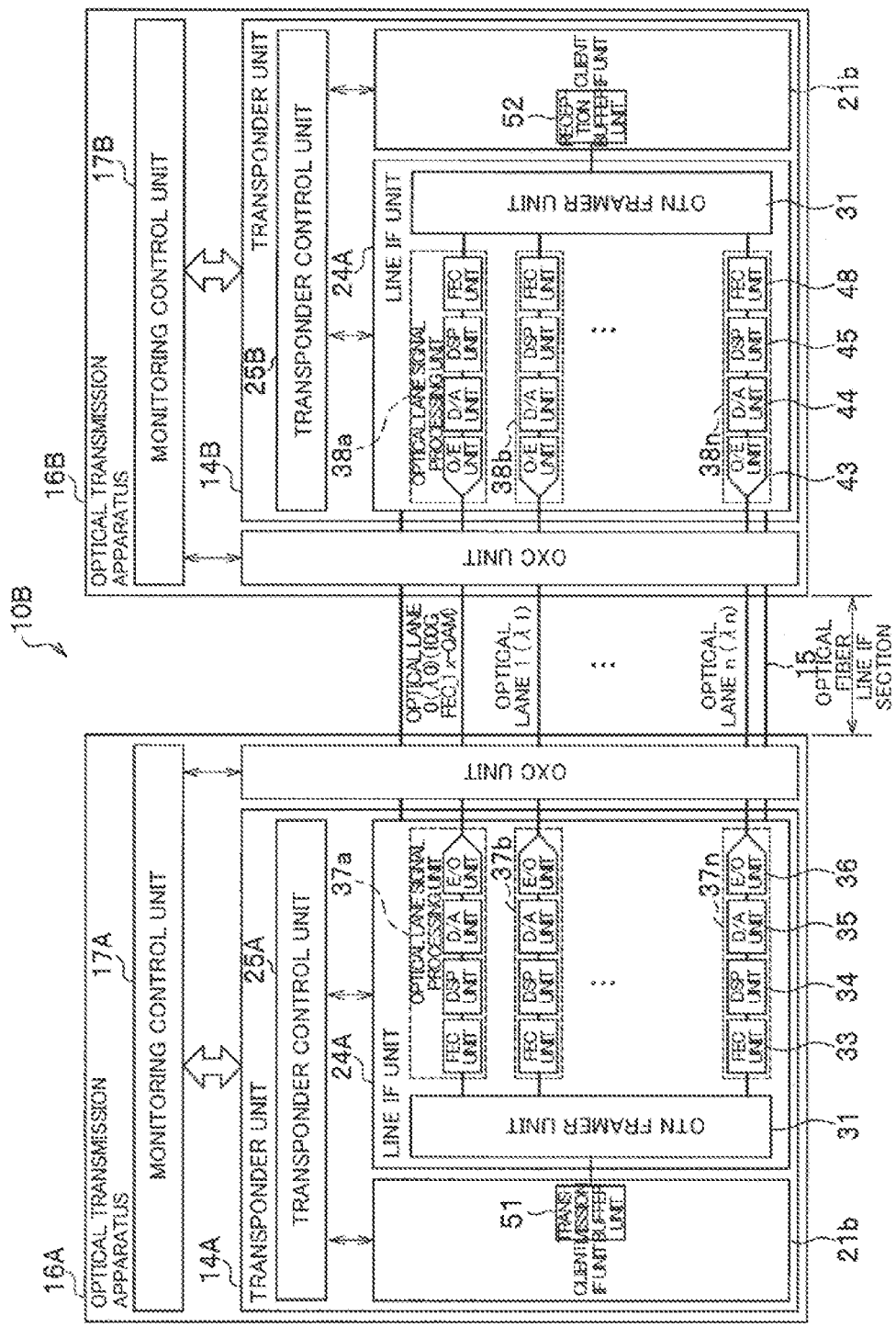
FIG. 6 is a block diagram illustrating configurations of a transponder unit on a transmitting end and a transponder unit on a receiving end according to the second embodiment.

The transponder units 14A1 and 14B1 have a similar configuration. FIGS. 5 and 6 illustrate functions of the transponder unit 14A1 on the transmitting end and functions of the transponder unit 14B1 on the receiving end.

As illustrated in FIG. 5, in the transponder unit 14A1 on the transmitting end, both the client IF units 21b and 22b include a transmission buffer unit 51, and the control unit 25A1 includes a setting table 54a. In the transponder unit 14B1 on the receiving end, both the client IF units 21b and 22b include a reception buffer unit 52, and the control unit 25B1 includes a setting table 54b.

Figure 8:
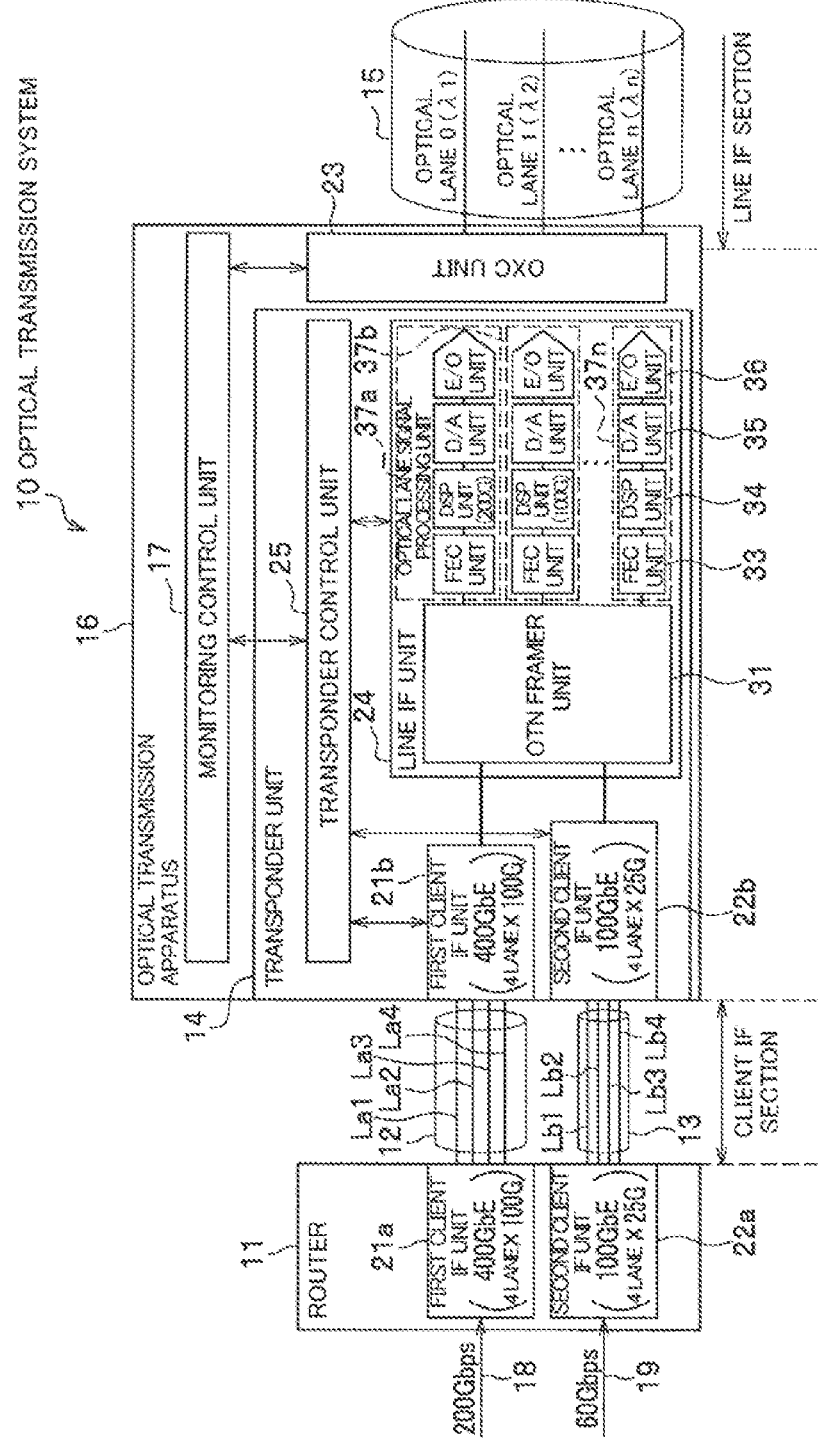
FIG. 8 is a block diagram illustrating a configuration of a conventional optical transmission system.

As illustrated in FIG. 6, the transponder unit 14A1 on the transmitting end includes a line IF unit 24A1 having the same transmission functions as those of the line IF unit 24 illustrated in FIG. 8. Namely, the line IF unit 24A1 illustrated in FIG. 6 includes an OTN framer unit 31 and optical lane signal processing units 37a to 37n.

A line IF unit 24B1 on the receiving end includes optical lane signal processing units 38a to 38n and an OTN framer unit 31. Each of the optical lane signal processing units 38a to 38n includes an O/E unit 43, an A/D unit 44, DSP unit 45, and an FEC unit 48 described above. The optical lane signal processing units 37a to 37n and 38a to 38n constitute a processing unit recited in the claims.

The transponder unit 14A1 on the transmitting end and the transponder unit 14B1 on the receiving end perform the following processing (1) to (3).

When the transponder units 14A1, 14B1 open a path by changing the band of the optical lanes 0 to n set in an optical fiber 15 in the line IF section, the transponder units 14A1, 14B1 measure synchronization time δt. Specifically, to switch a communication mode (described below) that corresponds to the band, the transponder units 14A1, 14B1 preliminarily measure PLL (phase locked loop) synchronization time in the DSP unit 34 on the receiving end and synchronization time needed before the various kinds of processing, such as dispersion compensation and phase recovery, and error correction decoding processing in the FEC unit 33 are operated normally.

The communication mode is a communication method in which a modulation method such as QAM, a baud rate, and an error correction method are combined. The communication mode corresponds to a DSP operation mode such as a modulation operation and a PLL synchronization operation performed by the DSP units 34, 45 and an FEC operation mode such as an error correction coding operation and an error correction decoding operation performed by the FEC units 33, 48.

The transponder units 14A1, 14B1 perform preliminary setting processing in which, by storing the above-measured synchronization time δt_1 to δt_k that correspond to respective communication modes (1 to k) in the setting tables 54a, 54b, in response to a request to change setting of the communication mode synchronization time from the control unit 25A1 on the transmitting end, the control unit 25B1 on the receiving end causes the DSP unit 45 or the reception buffer unit 52 to immediately reflect the setting change request.

(2) When switching the communication mode after the above preliminary setting has been made, in accordance with the setting contents from an operator, the transponder units 14A1 and 14B1 cause the OTN framer unit 31 on the transmitting end to insert a mode switching identifier (also referred to as an identifier) that indicates a communication mode switching request to the overhead of the frame signal. Next, the transponder units 14A1, 14B1 cause the OTN framer unit 60B on the receiving end to read the mode switching identifier in the overhead and performs processing for changing the communication mode.

(3) When the transponder units 14A1, 14B1 switch the communication mode, the timing of switching the communication mode and the band of an individual one of the optical lanes 0 to n needs to be matched between the transmitting end and the receiving end. Thus, the transponder units 14A1, 14B1 cause the transmission buffer unit 51 corresponding to the switch-target optical lane to hold the transmitted signal (transmitted data) for a period of the synchronization time on the transmitting end and perform the synchronization processing while suspending the data transmission from the reception buffer unit 52 on the receiving end. After this synchronization processing time, the transponder unit 14A1 on the transmitting end and the transponder unit 14B1 on the receiving end perform processing for resuming the data transmission and reception therebetween.

Figure 7:
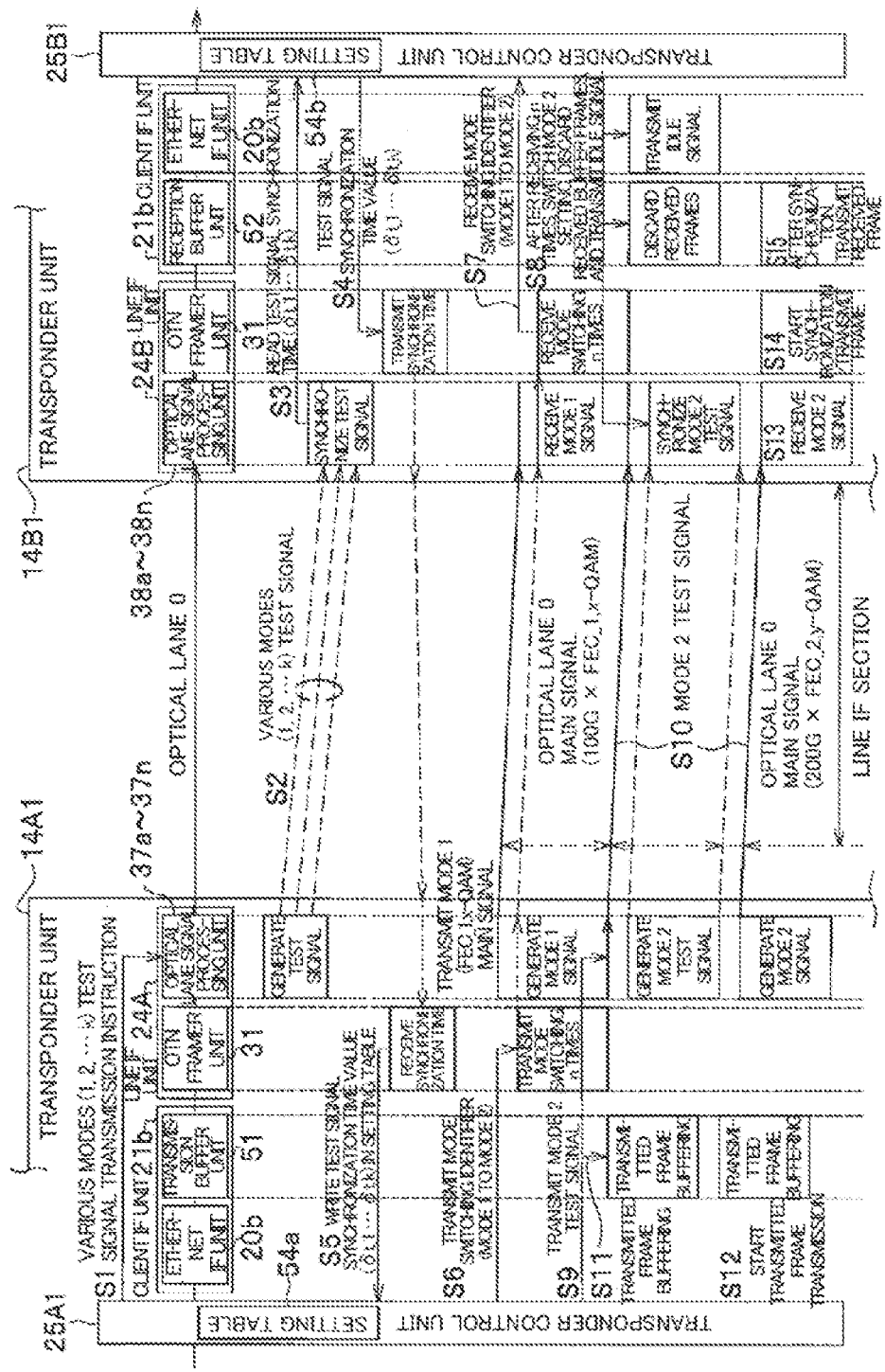
FIG. 7 is a sequence diagram illustrating processing for switching a communication mode and a band of an optical lane in a line IF section according the second embodiment.

The processing for switching the communication mode and the band of the optical lanes 0 to n in the line IF section will be described detail with reference to a sequence diagram in FIG. 7. As an example, the processing for switching the communication mode and the band of the optical lane 0 will be described. The communication mode is referred to as the mode.

In step S1, the control unit 25A1 of the transponder unit 14A1 on the transmitting end notifies the FEC unit 33 and the DSP unit 34 on the transmitting end of an instruction to transmit test signals corresponding to the various communication modes (1, 2, . . . , and k) to the optical lane 0.

In step S2, in response to this notification, to measure how much synchronization time δt is needed to synchronize the transmitted signal on the receiving end, after the FEC unit 33 on the transmitting end adds an error correcting code to the individual test signal, the DSP unit 34 transmits the test signals St_1, St_2, . . . , and St_k that correspond to the respective communication modes (1, 2, . . . , and k) to the optical lane 0.

In the above processing performed by the FEC unit 33 and the DSP unit 34, as denoted as "OPTICAL LANE 0 (100 G FEC_1 x-QAM)" in the line IF section, the test signal St_1 corresponding to the communication mode 1 which applies a band of 100 Gbps and FEC_1 is generated and transmitted to the optical lane 0.

This test signal St_1 is received on the receiving end, and after the DSP unit 45 performs synchronization processing, the FEC unit 48 performs FEC synchronization processing. When the synchronization is established, time needed for the synchronization is represented as synchronization time δt_1, δt_2, . . . , and δt_k.

Next, in step S3, the control unit 25B1 of the transponder unit 14B1 on the receiving end performs a synchronization time reading control operation in which the control unit 25B1 reads each of the synchronization time δt_1, δt_2, . . . , and δt_k corresponding to the various transmission modes, which have been transmitted from the DSP unit 45 and the FEC unit 48, and writes and sets the read synchronization time in the setting table 54b.

Next, in step S4, the control unit 25B1 on the receiving end transmits the synchronization time δt_1, δt_2, . . . , and δt_k to the transmitting end. In step S5, the transponder unit 14A1 on the transmitting end receives the synchronization time δt_1, δt_2, . . . , and δt_k, and the control unit 25A1 writes and sets the received synchronization time in the setting table 54a.

In steps S6, the control unit 25A1 on the transmitting end inserts, to the OTN framer unit 31 n times, a mode-2 switching identifier (denoted as "MODE SWITCHING IDENTIFIER" in FIG. 7) indicating a communication mode 2 to which the communication mode is to be switched. The OTN framer unit 31 writes one mode-2 switching identifier in each header to be framed, and in step S7, the OTN framer unit 31 transmits this OTN frame signal to the transponder unit 14B1 on the receiving end via the optical lane 0. This processing in which the mode-2 switching identifier is written in the header and transmitted is repeated n times to set the timing of a discarding operation that is performed downstream by the reception buffer unit 52. Specifically, by preliminarily defining an operation in which, after receiving the test signal n times, the reception buffer unit 52 performs the discarding operation, the transmission of the test signal to the downstream side will be stopped.

The communication mode 2 is a communication mode in which, as denoted as "OPTICAL LANE 0 MAIN SIGNAL (200 G FEC_2 x-QAM)" in the line IF section, "FEC_2" indicating the error correction method and "x-QAM" indicating the multi-level modulation method are combined. In other words, the communication mode 2 is a communication mode that transmits an optical signal having a band of 200 Gbps that has been modulated from a data signal by the multi-level modulation method.

In the transponder unit 14B1 that has received the OTN frame signal including the mode-2 switching identifier, in step S8, the control unit 25B1 on the receiving end reads the mode-2 switching identifier inserted in the header of the OTN frame signal from the OTN framer unit 60B and writes and sets the read mode-2 switching identifier in the setting table 54b. The preparation for the switching to the communication mode 2 corresponding to the band of 200 Gbps to be switched to is then completed.

Next, the control unit 25A1 on the transmitting end performs processing for switching to the communication mode 2 as described below. In step S9, the control unit 25A1 notifies the OTN framer unit 31, the FEC unit 33, and the DSP unit 34 of an instruction to transmit a test signal for the communication mode 2. The OTN framer unit 31 converts the test signal into an OTN frame. Furthermore, the DSP unit 34 and the FEC unit 34 perform DSP processing and FEC processing on the test signal, and this processed test signal is transmitted to the optical lane 0 in step S10.

More specifically, when switching to the communication mode 2 as described above, the timing of switching the current communication mode and band of the optical lane 0 to the communication mode 2 and the band of 200 Gbps needs to be matched between the transmitting end and the receiving end.

In step S11, the control unit 25A1 causes the transmission buffer unit 51 to start buffering the main signal which is the Ethernet signal in the communication mode 2. This buffering is performed for a period of the synchronization time δt_2 corresponding to the communication mode 2. The processing in steps S9 to S11 is performed simultaneously.

In steps S12, the transponder unit 14B1 on the receiving end receives the test signal for the communication mode 2 that is transmitted with the delay of the synchronization time δt_2. With these test signals for the communication mode 2, the synchronization will be established by the DSP unit 45 and the FEC unit 48 as described below. By using the test signals, the DSP unit 45 performs DSP synchronization processing such as clock synchronization, dispersion compensation, equalization processing, frequency offset, and carrier phase recovery and establishes the synchronization. Subsequently, the FEC unit 48 performs the FEC synchronization processing described above and establishes the synchronization. Thus, the synchronization between the transmitting end and the receiving end is established.

Furthermore, after the FEC synchronization processing has been completed by the FEC unit 48, the test signals are output to the reception buffer unit 52 via the OTN framer unit 60B. At this point, in step S8, the control unit 25B1 instructs the reception buffer unit 52 to stop transmitting the signal. When receiving the instruction, the reception buffer unit 52 discards the test signals buffered therein. In other words, the test signals are stopped at the reception buffer unit 52. With this discarding operation, the test signals are not transmitted to the communication terminals of the clients via the router 11 downstream (FIG. 5). In the meantime, idle signals are transmitted to the Ether-IFs to prevent communication errors between the client IFs.

When the synchronization processing has been completed between the transmitting end and the receiving end, in step S12, the control unit 25A1 on the transmitting end performs a control operation for turning off the buffering in the transmission buffer unit 51. In response to this operation, the main signal held in the transmission buffer unit 51 for a period of the synchronization time $\delta t\_2$ is converted into an OTN frame by the OTN framer unit 31, and after the DSP unit 34 and the FEC unit 34 have processed this main signal, in step S15, the processed main signal is transmitted to the optical lane 0.

Namely, by performing the control operation for alternating between the starting and ending of the buffering in steps S11 and S12 as described above, the transmission buffer unit 51 performs the operations for holding and outputting the main signal for a period of the synchronization time $\delta t\_2$.

In step S13, the transponder unit 14B1 on the receiving end receives the OTN-framed main signal, and the DSP unit 45 and the FEC unit 48 perform the respective processing on the received signal. After the signal has been processed, when the OTN framer unit 60B detects the OTN frame signal, which is the main signal, in step S14, the control unit 25B1 instructs the reception buffer unit 52 to start transmitting the signal. Thus, in step S15, the main signal is transmitted to the router 11 (FIG. 5) via the reception buffer unit 52, and the router 11 transmits the main signal further to the communication terminals.

Effects of Second Embodiment

The optical transmission system 10B according to the second embodiment described above is provided in both the router 11 serving as a first relay to which a communication terminal is connected and the transponder unit 14A1 serving as a second relay to which the router 11 is connected opposite to each other via the optical fiber 12 and includes the opposed client IF units 21a, 21b and the opposed client IF units 22a, 22b that set a plurality of optical lanes each having a different wavelength band in the optical fiber 12. In addition, the optical transmission system 10B is provided in both the transponder unit 14A1 and the transponder unit 14B1 serving as a second relay to which the transponder unit 14A1 is connected opposite to each other via the optical fiber 15 and includes the opposed line IF units 24A1, 24B1 that set a plurality of optical lanes 0 to n each having a different wavelength band in the optical fiber 15. Furthermore, the optical transmission system 10B performs processing for changing the band of the optical fiber 15 in the line IF section that relays the signal from the optical fiber 12 in the client IF section. This optical transmission system 10B has the following features that achieve unique effects.

(1) The transponder units 14A1, 14B1 include the transmission buffer unit 51 that holds the signal transmitted from the client IF units 21a, 21b and 22a, 22b of the router 11 and the reception buffer unit 52 that holds the signal received by the line IF units 24A1, 24B1 via the line IF section, in the client IF units 21a, 21b and 22a, 22b of the transponder units 14A1, 14B1.

Furthermore, the transponder units 14A1, 14B1 include the optical lane signal processing units 37a to 37n, 38a to 38n. The optical lane signal processing units 37a to 37n, 38a to 38n hold the signal transmitted from the router 11 in the transmission buffer unit 51 for a period of the synchronization time needed for synchronizing between the transmission end and the reception end when switching to the communication mode 2 in which a modulation method and an error correction method are combined, the communication mode 2 corresponding to an individual one of the bands of the optical lanes 0 to n set in the optical fiber 15 in the line IF section, and also perform synchronization processing for stopping the test signal corresponding to the communication mode 2 at the reception buffer unit 52 after receiving the test signal via the line IF section.

According to the above configuration, while the transmitted signals (main signals) are being held in the transmission buffer unit 51, the test signals received via the line IF section are discarded by the reception buffer unit 52, and in the meantime, while transmitting the idle signals to the client IFs, the synchronization processing is performed, and the communication mode is switched to the communication mode 2 that corresponds to the changed band. In this way, the communication in the line IF section does not need to be suspended. In other words, the band of the optical fiber 12 in the line IF section that relays the signal transmitted through the optical fiber 15 in the client IF section to which the communication terminal is connected can be changed to the same band as that in the client IF section without interruption. In addition, since the temporary evacuation lane p is not needed, the number of the components can be further reduced so that further reduction in power consumption can be achieved.

(2) The transponder units 14A1, 14B1 set, in the setting tables 54a, 54b, the synchronization time measured by the synchronization processing performed by the optical line signal processing units 38a to 38n after receiving the synchronization time of the line IF section corresponding to each of the various communication modes. In addition, the transponder units 14A1, 14B1 perform the preliminary setting operation by using the set synchronization time so that the optical lane signal processing units 38a to 38n can perform the synchronization processing.

According to the above configuration, when the band in the line IF section is changed and the communication mode is switched to a communication mode that corresponds to the changed band by establishing synchronization between the transmitting end the receiving end, the synchronization time preliminarily set in accordance with the control operation by the control unit is used. In this way, the processing unit can easily perform the synchronization processing.

In addition, the other specific configurations can be modified as appropriate without departing from the scope of the present invention.

REFERENCE SIGNS LIST 10A, 10B Optical transmission system
11 Router
12, 13, 15, 18, 19 Optical fiber
14A, 14B, 14A1, 14B1 Transponder unit
31 OTUCn framer unit
32a Copy unit 33, 48 FEC unit
34, 45 DSP unit
35 D/A unit
36 E/O unit
39, 46 Buffer unit
37a to 37n, 38a to 38n, 41a to 41n, 41p, 42p Optical lane signal processing unit
43 O/E unit
44 A/D unit
51 Transmission buffer unit
52 Reception buffer unit
54a, 54b Setting table
La1 to La4, Lb1 to Lb4 Optical lane
0 to n Optical lane
p Temporary evacuation lane

The invention claimed is:

1. An optical transmission system comprising:
a first and a second client IF (Interface) unit, the first client IF unit being provided in a first relay to which a communication terminal is connected and the second client IF unit being provided in a second relay to which the first relay is connected via a first optical transmission path, the first and second client IF unit being on opposite sides of the first optical transmission path, and the first and second client IF unit setting, in the first optical transmission path connecting the first and second relays, a plurality of optical lanes each having a different wavelength band, and
a first and a second line IF unit, the first line IF unit being provided in the second relay and the second line IF unit being provided in another second relay to which the second relay is connected via a second optical transmission path, the first and second line IF unit being on opposite sides of the second optical transmission path, and the first and second line IF unit setting, in the second optical transmission path connecting the second relays, a plurality of optical lanes each having a different wavelength band,
the optical transmission system configured to perform processing for changing a band of the second optical transmission path in a line IF section by the first and second line IF unit that relay a signal transmitted through the first optical transmission path in a client IF section by the first and second client IF unit, wherein the first line IF unit on a transmission end and the second line IF unit on a receiving end each comprise a processing unit, including one or more processors,
the first line IF unit on the transmission end configured to set a temporary evacuation lane as an optical lane having a band different from those of the plurality of optical lanes in the second optical transmission path in the line IF section,
the second line IF unit on the receiving end configured to select either a change-target optical lane or the temporary evacuation lane, the change-target optical lane being provided in the second optical transmission path in the line IF section and having a band to be changed to a same band as a band in the client IF section, while causing a buffer unit to absorb a delay difference between a signal received by the change-target optical lane and a signal received by the temporary evacuation lane, and
the first line IF unit on the transmission end configured to set the optical lane not selected to have the same band as the band in the client IF section.

2. The optical transmission system according to claim 1, wherein the first line IF unit on the transmission end further includes a copy unit, including one or more processors, configured to copy a transmitted signal directed to the optical transmission path in the line IF section, wherein the processing unit of the second line IF unit on the receiving end is configured to set a holding area in the buffer unit in the second line IF unit on the receiving end, the holding area configured to hold a signal data amount corresponding to signal data that is transmitted during a delay difference between a signal received by the change-target optical lane and a signal received by the temporary evacuation lane to absorb the delay difference,
wherein the processing unit in the first line IF unit on the transmission end is configured to transmit the transmitted signal which has been copied by the copy unit to the temporary evacuation lane to which a same band as that in the client IF section has been set and the processing unit in the second line IF unit on the receiving end is configured to select, after the transmitted signal has been received by the second line IF unit on the receiving end, the signal received from the temporary evacuation lane via the buffer unit in which the holding area is set, and
wherein the processing unit in the first line IF unit on the transmission end is configured to transmit a signal whose transmission speed is increased or decreased after the band of the change-target optical lane has been set to the same band as that in the client IF section and the processing unit in the second line IF unit on the receiving end is configured to select, after the transmitted signal has been received by the second line IF unit on the receiving end, the signal received from the change-target optical lane via the buffer unit in which the holding area is set.

3. The optical transmission system according to claim 1, wherein the processing unit in each of the first and second line IF unit is configured to perform processing for turning off a power supply to the temporary evacuation lane after the signal from the change-target optical lane has been selected.

4. An optical transmission system comprising:
a first and a second client IF unit, the first client IF unit being provided in a first relay to which a communication terminal is connected and the second client IF unit being provided in a second relay to which the first relay is connected via a first optical transmission path, the first and second client IF unit being on opposite sides of the first optical transmission path, and the first and second client IF unit setting, in the first optical transmission path connecting the first and second relays, a plurality of optical lanes each having a different wavelength band, and
a first and a second line IF unit, the first line IF unit being provided in the second relay and the second line IF unit being provided in another second relay to which the second relay is connected via a second optical transmission path, the first and second line IF unit being on opposite sides of the second optical transmission path, and the first and second line IF unit setting, in the second optical transmission path connecting the second relays, a plurality of optical lanes each having a different wavelength band,
the optical transmission system configured to perform processing for changing a band of the second optical transmission path in a line IF section by the first and second line IF unit that relay a signal transmitted through the first optical transmission path in a client IF section by the first and second client IF unit, wherein the second relay on a transmission end and the another second relay on a reception end comprises:

a transmission buffer in the second relay on the transmission end configured to hold a signal transmitted from the first client IF unit in the first relay, in the second client IF unit in the second relay, a reception buffer in the another second relay on the reception end configured to hold a signal received by the second line IF unit via the line IF section, and a processing unit in the second relay on the transmission end, including one or more processors, configured to hold the signal transmitted from the first relay in the transmission buffer for a period of synchronization time needed for synchronizing the transmission end and the reception end when switching to a communication mode in which a modulation method and an error correction method are combined, the communication mode corresponding to an individual one of bands of optical lanes set in the second optical transmission path in the line IF section, and a processing unit on the another second relay on the reception end, including one or more processors, configured to perform synchronization processing for stopping a test signal corresponding to the communication mode at the reception buffer after receiving the test signal via the line IF section.

5. The optical transmission system according to claim 4, wherein the second relay further comprises a control unit, including one or more processors, configured to set, in setting tables, synchronization time measured by the synchronization processing that is performed after receiving synchronization time in the line IF section corresponding to various communication modes and to perform a preliminary setting control operation by using the set synchronization time so that the processing unit in the second relay on the transmission end can perform the synchronization processing.

6. An optical transmission method of an optical transmission system that includes a first and a second client IF (Interface) unit, the first client IF unit being provided in a first relay to which a communication terminal is connected and the second client IF unit being provided in a second relay to which the first relay is connected via a first optical transmission path, the first and second client IF unit being on opposite sides of the first optical transmission path, and the first and second client IF unit setting, in the first optical transmission path connecting the first and second relays, a plurality of optical lanes each having a different wavelength band, and includes a first and a second line IF unit, the first line IF unit being provided in the second relay and the second line IF unit being provided in another second relay to which the second relay is connected via a second optical transmission path, the first and second line IF unit being on opposite sides of the second optical transmission path, and the first and second line IF unit setting, in the second optical transmission path connecting the second relays, a plurality of optical lanes each having a different wavelength band, the optical transmission system configured to perform processing for changing a band of the second optical transmission path in a line IF section by the first and second line IF unit that relay a signal transmitted through the first optical transmission path in a client IF section by the first and second client IF unit, the optical transmission method comprising:

setting, by the first line IF unit on a transmission end, a temporary evacuation lane as an optical lane having a band different from those of the plurality of optical lanes in the second optical transmission path in the line IF section;

selecting, by the second line IF unit on a receiving end, either a change-target optical lane or the temporary evacuation lane, the change-target optical lane being provided in the second optical transmission path in the line IF section and having a band to be changed to a same band as a band in the client IF section, while causing a buffer unit to absorb a delay difference between a signal received by the change-target optical lane and a signal received by the temporary evacuation lane; and setting, by the first line IF unit on a transmission end, the optical lane not selected to have the same band as the band in the client IF section.

* * * * *